(12) United States Patent
Merlau et al.

(10) Patent No.: US 10,294,082 B2
(45) Date of Patent: May 21, 2019

(54) TURBOMACHINE COMPONENT HANDLING ASSEMBLY

(71) Applicant: General Electric Company, Schenectady, NY (US)

(72) Inventors: Thomas Michael Merlau, Greenville, SC (US); Joseph Daniel Becker, Travelers Rest, SC (US); Stuart Craig Hanson, Anderson, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 121 days.

(21) Appl. No.: 15/635,363

(22) Filed: Jun. 28, 2017

(65) Prior Publication Data

US 2019/0010026 A1 Jan. 10, 2019

(51) Int. Cl.
| | | |
|---|---|---|
| *B66C 1/10* | (2006.01) | |
| *B66C 1/62* | (2006.01) | |
| *F01D 25/28* | (2006.01) | |
| *F02C 7/20* | (2006.01) | |
| *F23R 3/46* | (2006.01) | |

(52) U.S. Cl.
CPC ............. *B66C 1/105* (2013.01); *B66C 1/107* (2013.01); *B66C 1/62* (2013.01); *F01D 25/285* (2013.01); *F02C 7/20* (2013.01); *F05D 2230/68* (2013.01); *F23R 3/46* (2013.01); *F23R 2900/00019* (2013.01)

(58) Field of Classification Search
CPC .. B66C 1/10; B66C 1/105; B66C 1/22; B66C 1/24; B66C 1/26; B66C 1/107; B66C 1/62; F01D 25/285; F02C 7/20; F23R 3/46; F23R 2900/00019; F05D 2230/68
See application file for complete search history.

(56) References Cited

U.S. PATENT DOCUMENTS

| | | | | |
|---|---|---|---|---|
| 4,358,143 A * | 11/1982 | Cullen | ................... | B21C 47/242 242/533 |
| 4,687,244 A * | 8/1987 | Cullen | ................. | B65H 67/065 294/86.41 |
| 5,392,322 A | 2/1995 | Whitling et al. | | |
| 5,600,690 A | 2/1997 | Weems et al. | | |
| 5,642,979 A * | 7/1997 | Cullen | ................... | B21C 47/242 294/67.5 |
| 6,354,644 B1 * | 3/2002 | Zaguroli, Jr. | ........ | B65H 19/123 294/67.22 |
| 6,371,685 B1 | 4/2002 | Weems et al. | | |
| 6,716,018 B2 * | 4/2004 | Abrego | ..................... | B66C 1/10 294/67.21 |
| 6,733,058 B1 * | 5/2004 | Nakajima | ............ | B65H 19/123 242/559.1 |

\* cited by examiner

*Primary Examiner* — Stephen A Vu

(74) *Attorney, Agent, or Firm* — Dority & Manning, PA

(57) ABSTRACT

The present disclosure is directed to a component handling assembly. The component handling assembly includes a base member, an arm pivotably coupled to the base member, and a beam rotatably coupled to the base member. The component handling assembly also includes a counterweight rotatably coupled to a first end of the beam. The component handling assembly further includes a coupling assembly coupled to a second end of the beam. The coupling assembly is configured for coupling to a component. Rotating the counterweight in a first direction rotates the beam, the coupling assembly, and the component in a second direction.

13 Claims, 4 Drawing Sheets

TURBOMACHINE COMPONENT HANDLING ASSEMBLY

FIELD

The present disclosure generally relates to turbomachines. More particularly, the present disclosure relates to handling assemblies for turbomachine components.

BACKGROUND

A gas turbine engine generally includes a compressor section, a combustion section, and a turbine section. The compressor section progressively increases the pressure of air entering the gas turbine engine and supplies this compressed air to the combustion section. The compressed air and a fuel (e.g., natural gas) mix within the combustion section and burn within one or more combustion chambers to generate high pressure and high temperature combustion gases. The combustion gases flow from the combustion section into the turbine section where they expand to produce work. For example, expansion of the combustion gases in the turbine section may rotate a rotor shaft connected to a generator to produce electricity.

In certain configurations, the combustion section includes a compressor discharge casing defining a plurality of annularly arranged apertures and a plurality of combustors. During assembly, each combustor is at least partially inserted into one of the plurality of apertures and coupled to the compressor discharge casing. The size and weight of the combustors necessitates the use a lifting arm or some other type of lifting device when installing the combustors. However, conventional lifting arms for installing the combustors are heavy, complex, and expensive, thereby increasing the cost of assembling the gas turbine engine.

BRIEF DESCRIPTION

Aspects and advantages of the technology will be set forth in part in the following description, or may be obvious from the description, or may be learned through practice of the technology.

In one aspect, the present disclosure is directed to a component handling assembly. The component handling assembly includes a base member, an arm pivotably coupled to the base member, and a beam rotatably coupled to the base member. The component handling assembly also includes a counterweight rotatably coupled to a first end of the beam. The component handling assembly further includes a coupling assembly coupled to a second end of the beam. The coupling assembly is configured for coupling to a component. Rotating the counterweight in a first direction rotates the beam, the coupling assembly, and the component in a second direction.

In another aspect, the present disclosure is directed to a component handling assembly. The component handling assembly includes a base member, an arm pivotably coupled to the base member, and a beam rotatably coupled to the base member. The component handling assembly also includes a counterweight rotatably coupled to a first end of the beam. The component handling assembly further includes a coupling assembly coupled to a second end of the beam. Furthermore, the component handling assembly includes a component removably coupled to the coupling assembly. Rotating the counterweight in a first direction rotates the beam, the coupling assembly, and the component in a second direction.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
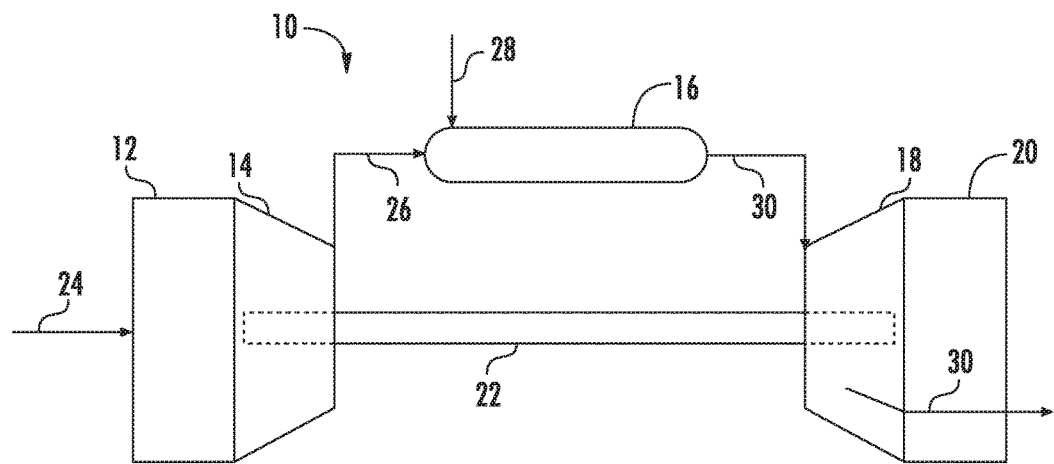
FIG. 1 is a schematic view of an exemplary gas turbine engine in accordance with one embodiment of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Now referring to the drawings, wherein identical numerals indicate the same elements throughout the figures, FIG. 1 schematically illustrates an exemplary gas turbine engine 10. As depicted therein, the gas turbine engine 10 includes an inlet section 12, a compressor 14, a combustion section 16, a turbine 18, and an exhaust section 20. The compressor 14 and turbine 18 may be coupled by a shaft 22, which may be a single shaft or a plurality of shaft segments coupled together.

During operation, the gas turbine engine 10 produces mechanical rotational energy, which may, e.g., be used to generate electricity. More specifically, air 24 enters the inlet section 12 of the gas turbine engine 10. From the inlet section 12, the air 24 flows into the compressor 14, where it is progressively compressed to provide compressed air 26 to the combustion section 16. The compressed air 26 in the combustion section 16 mixes with a fuel 28 to form an air-fuel mixture, which burns to produce high temperature and high pressure combustion gases 30. From the combustion section 16, the combustion gases 30 flow through the turbine 18, which extracts kinetic and/or thermal energy from the combustion gases 30. This energy extraction rotates the shaft 22, thereby creating mechanical rotational energy for powering the compressor 14 and/or generating electricity. The combustion gases 30 exit the gas turbine engine 10 through the exhaust section 20.

Figure 2:
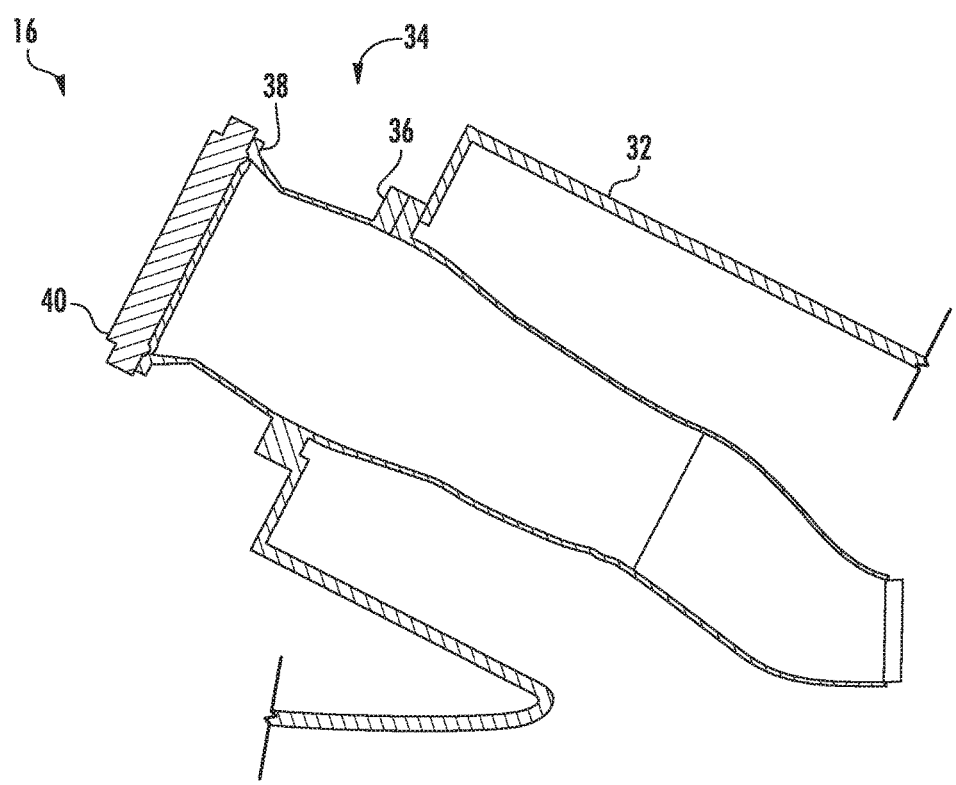
FIG. 2 is a cross-sectional side view of a portion of an exemplary combustion section in accordance with one embodiment of the present disclosure.

FIG. 2 is a cross-sectional side view of an exemplary embodiment of a portion of the combustion section 16. As shown, the combustion section 16 may include a compressor discharge casing 32 and a plurality of combustors 34. Each combustor 34 is partially positioned within and coupled to the compressor discharge casing 32. In general, the combustors 34 are annular arranged about the compressor discharge casing 32. Although only one combustor 34 is shown in FIG. 2, the combustion section 16 may include any suitable number of combustors 34 (e.g., twelve combustors 34) in alternate embodiments.

As illustrated in FIG. 2, the combustor 34 may include various mounting flanges. For example, the combustor 34 may include a first mounting flange 36 that couples to the compressor discharge casing 32. The combustor 34 may also include a second mounting flange 38 to which an end cover 40 may couple. In alternate embodiments, however, the combustor 34 may include additional flanges in addition to or lieu of the first and second flanges 36, 38. In further embodiments, the combustor 34 may not include any flanges.

Figure 3:
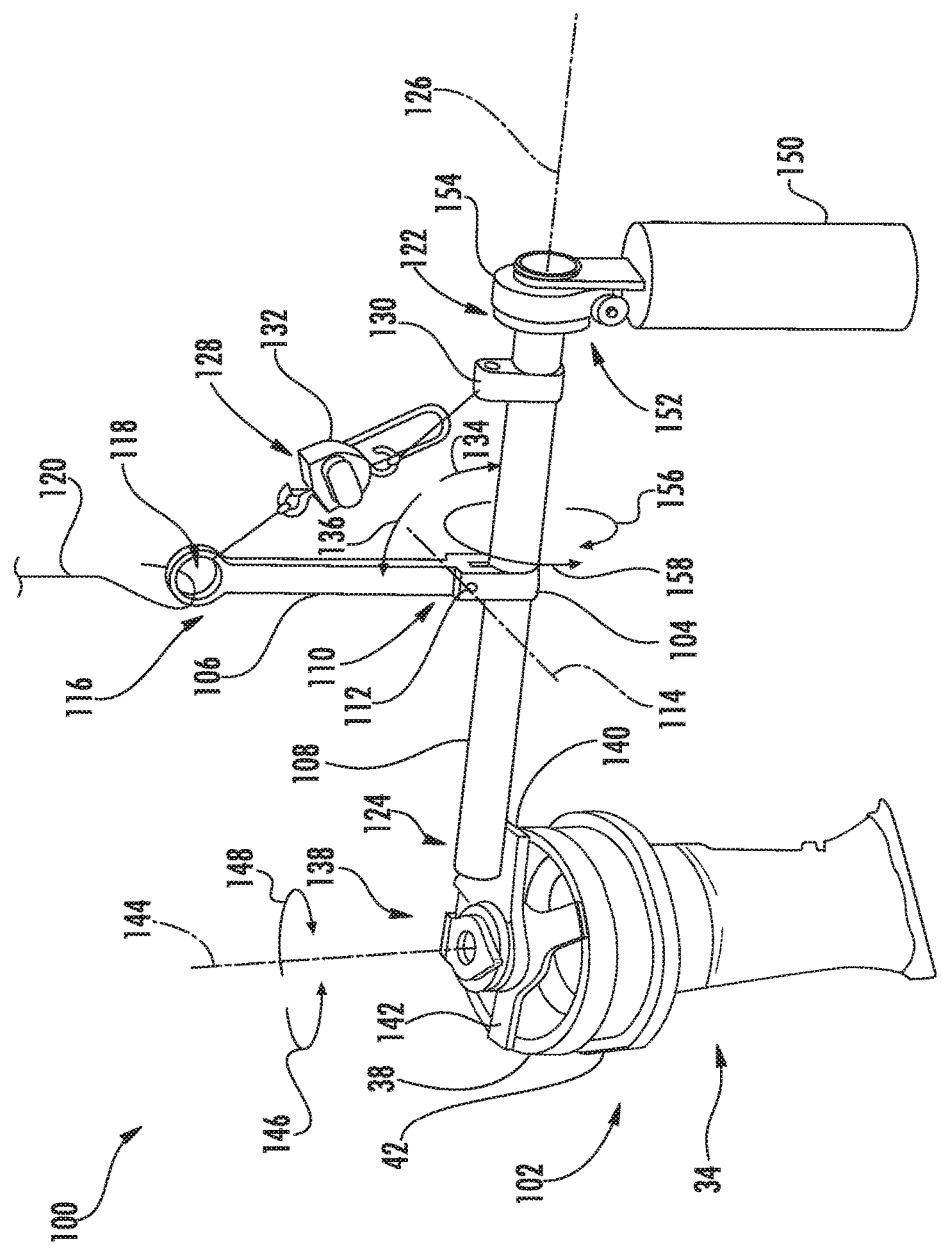
FIG. 3 is a perspective view of a turbomachine component handling assembly, illustrating the relative locations of various components thereof when a turbomachine component is in a first loaded position in accordance with one embodiment of the present disclosure.

FIG. 3 is a perspective view of a turbomachine component handling assembly 100 in accordance with one embodiment of the present disclosure. As will be described in greater detail below, the handling assembly 100 may be used for manipulating, oriented, adjusting, transporting, or otherwise handling a turbomachine component 102. In the embodiment shown in FIG. 3, the turbomachine component 102 corresponds to one of the combustors 34. As such, the handling assembly 100 may be used, for example, to facilitate installation of the combustors 34 into the compressor discharge casing 32. In alternate embodiments, however, the turbomachine component 102 may be any suitable component of the turbomachine 10, such as a component of the combustor 34 (e.g., the liner 50).

As shown in FIG. 3, the handling assembly 100 includes a base member 104, an arm 106, and a beam 108. More specifically, a first end 110 of the arm 106 pivotably couples to the base member 104 at a pivot joint 112. As such, the arm 106 may pivot relative to the base member 104 and the beam 108 about a pivot axis 114. An opposed second end 116 of the arm 106 may define an aperture 118 for receiving a hook 120 of a crane (not shown), thereby permitting the crane to lift and/or move the handling assembly 100. Moreover, the beam 108 rotatably couples to the base member 104 between a first end 122 of the beam 108 and a second end 124 of the beam 108. In particular embodiments, the beam 108 rotatably couples to the base member 104 at a central location between the first and second ends 122, 124. As such, the beam 108 may rotate relative to the base member 104 about a longitudinal axis 126 extending between the first and second ends 122, 124 of the beam 108. As shown, the longitudinal axis 126 may generally be perpendicular to the pivot axis 114. Furthermore, in some embodiments, the beam 108 may have a circular cross-section to facilitate rotation relative to the base member 104.

The handling assembly 100 may also include a first actuator 128 that pivots the arm 106 about the pivot axis 114. More specifically, the first actuator 128 may be coupled between the arm 106 and the beam 108. In the embodiment shown in FIG. 3, for example, the first actuator 128 may be coupled between the aperture 118 defined by the arm 106 and a mount 130 coupled to beam 108 between the base member 112 and the first end 122. In alternate embodiments, the first actuator 128 may be coupled to any portion of the arm 106 and/or the mount 130 may be coupled to beam 108 between the base member 112 and the second end 124. As shown, the first actuator 128 may correspond to a motor-driven winch 132. In this respect, the winch 132 may pivot the arm 106 about the pivot axis 114 in a first direction (e.g., as indicated by arrow 134 in FIG. 3) to move the second end 116 of the arm 106 closer to the first end 122 of the beam 108. Similarly, the winch 132 may pivot the arm 106 about the pivot axis 114 in a second direction (e.g., as indicated by arrow 136 in FIG. 3) to move the second end 116 of the arm 106 closer to the center of the beam 108. As will be described in greater detail below, the winch 132 may be used to maintain the arm 106 in a position where the aperture 118 and the crane hook 120 are located over the center of gravity of the handling assembly 100 and the turbomachine component 102 (when coupled to the handling assembly 100). In alternate embodiments, the first actuator 128 may be any suitable actuator that may pivot the arm 106 about the pivot axis 114, such as a ratcheting device, a linear actuator, or a fluid-driven actuator.

The handling assembly 100 further includes a turbomachine component coupling assembly 138. As shown, the coupling assembly 138 includes a mounting plate 140 that couples to the second end 124 of the beam 108. In particular embodiments, the mounting plate 140 may be fixedly coupled to the second end 124 of the beam 108. The coupling assembly 138 also includes a mating bracket 142 rotatably coupled to the mounting plate 140. The mating bracket 142 also removably couples to the turbomachine component 102, such as via mechanical fasteners (not shown). In embodiments where the turbomachine component 102 corresponds to the combustor 34, such as the embodiment shown in FIG. 3, the mating bracket 142 may be coupled to the second flange 38 of the combustor 34 via mechanical fasteners. In alternate embodiments, however, the mating bracket 142 may couple to the turbomachine component 102 in any suitable manner. Furthermore, the coupling assembly 138 may have any suitable configuration the permits relative rotation between the beam 108 and the turbomachine component 102.

As mentioned above, the mating bracket 142 is rotatably coupled to the mounting plate 140. In this respect, the mating plate 142 may rotate about a rotation axis 144 relative to the mounting plate 140 and the beam 108. As shown, the rotation axis 144 may be perpendicular to the pivot axis 114 and/or the longitudinal axis 126. For example, the mating plate 142 may rotate about the rotation axis 144 relative to the mounting plate 140 in a first direction (e.g., as indicated by arrow 146), thereby rotating the turbomachine component 102 in the first direction 146 relative to the beam 108. Similarly, the mating plate 142 may rotate about the rotation axis 144 relative to the mounting plate 140 in a second direction (e.g., as indicated by arrow 148), thereby rotating the turbomachine component 102 in the second direction 148 relative to the beam 108. As such, the coupling assembly 128 may include a suitable bearing (not shown) positioned between the mounting plate 140 and the mating bracket 142 to facilitate rotation therebetween. Furthermore, the coupling assembly 138 may include a motor or other actuator (not shown) to rotate mating plate 142 may rotate about a rotation axis 144 relative to the mounting plate 140.

Furthermore, the handling assembly 100 includes a counterweight 150 rotatably coupled to the first end 122 of the beam 108. In general, the counterweight 150 supports the weight of the turbomachine component 102. In this respect, the counterweight 150 may be positioned on one side of the center gravity of the handling assembly 100 and the turbomachine component 102 may be positioned on the other side of the center of gravity of the handling assembly 100. Moreover, the counterweight 150 may have a similar weight to the turbomachine component 102 in some embodiments.

The handling assembly 100 may further include a second actuator 152 that rotates the beam 108 about the longitudinal axis 126. More specifically, the second actuator 152 may be coupled between the first end 122 of the beam 108 and the counterweight 150. As shown, the first actuator 128 may correspond to a motor-driven slewing drive 154. In this respect, the slewing drive 154 may rotate the beam 108 relative to the counterweight 150 about the longitudinal axis 126 in a first direction (e.g., as indicated by arrow 156 in FIG. 3) to move rotate the coupling assembly 138 and the turbomachine component 102 in the first direction 156. Similarly, the slewing drive 154 may rotate the beam 108 about the longitudinal axis 126 in a second direction (e.g., as indicated by arrow 158 in FIG. 3) to move rotate the coupling assembly 138 and the turbomachine component 102 in the second direction 158. As will be described in greater detail below, the slewing drive 154 may be used to adjust the orientation of the turbomachine component 102 for installation into the turbomachine 10. In embodiments where the turbomachine component 102 is the combustor 34, for example, the slewing drive 154 may adjust the orientation of the combustor 34 for installation in the compressor discharge casing 32. In alternate embodiments, the second actuator 154 may be any suitable actuator that may rotate the beam 108 about the longitudinal axis 126, such as another suitable actuator and gearbox combination.

Figure 4:
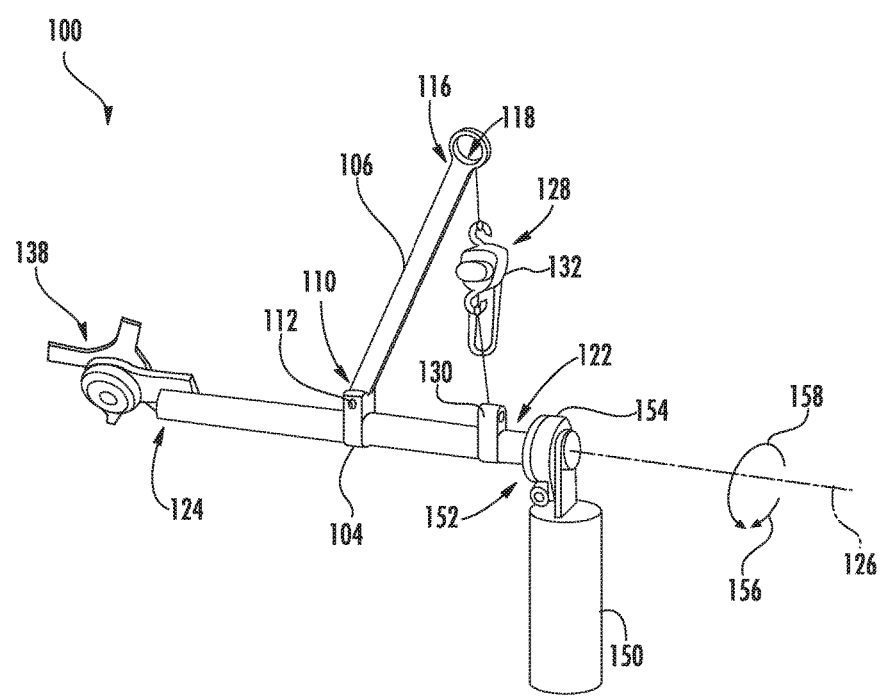
FIG. 4 is a perspective view of the turbomachine component handling assembly shown in FIG. 3, illustrating the turbomachine component handling assembly when unloaded in accordance with one embodiment of the present disclosure.

FIG. 4 illustrates the handling assembly 100 when unloaded (i.e., not coupled to the turbomachine component 102). As shown, the first actuator 128 has pivoted the arm 106 so that the aperture 118 defined by the second end 116 of the arm 106 is located proximate to the first end 122 of the beam 108. In this respect, the aperture 118 and the crane hook 120 (FIG. 3) are aligned along the longitudinal axis 126 with the center of gravity of the handling assembly 100, thereby balancing the handling assembly 100 on the crane hook 120. In alternate embodiments, the handling assembly 100 may have other configurations in the unloaded position.

Referring again to FIG. 3, the handling assembly 100 is shown in a first loaded position. For example, the first loaded position may be used to move the turbomachine component 102 within the assembly facility for the turbomachine 10, such as from a staging area where the turbomachine component 102 is stored to an installation area where the turbomachine component 102 is coupled to the turbomachine 10. As shown, the handling assembly 100 is coupled to the turbomachine component 102. Coupling the turbomachine component 102 to the handling assembly 100 changes the center of gravity of the handling assembly 100. In this respect, the first actuator 128 pivots the arm 106 so that the aperture 118 is aligned along the longitudinal axis 126 with the new center of gravity, thereby balancing the handling assembly 100 and the turbomachine component 102 on the crane hook 120. For example, the first actuator 128 may pivot the arm 106 so that the aperture 118 aligned along the longitudinal axis 126 with the base member 104. Furthermore, the counterweight 150 and the turbomachine component 102 may generally be oriented parallel to each other to facilitate movement of the handling assembly 100 and the turbomachine component 102 through the assembly facility. In alternate embodiments, the handling assembly 100 may have other configurations in the first loaded position.

Figure 5:
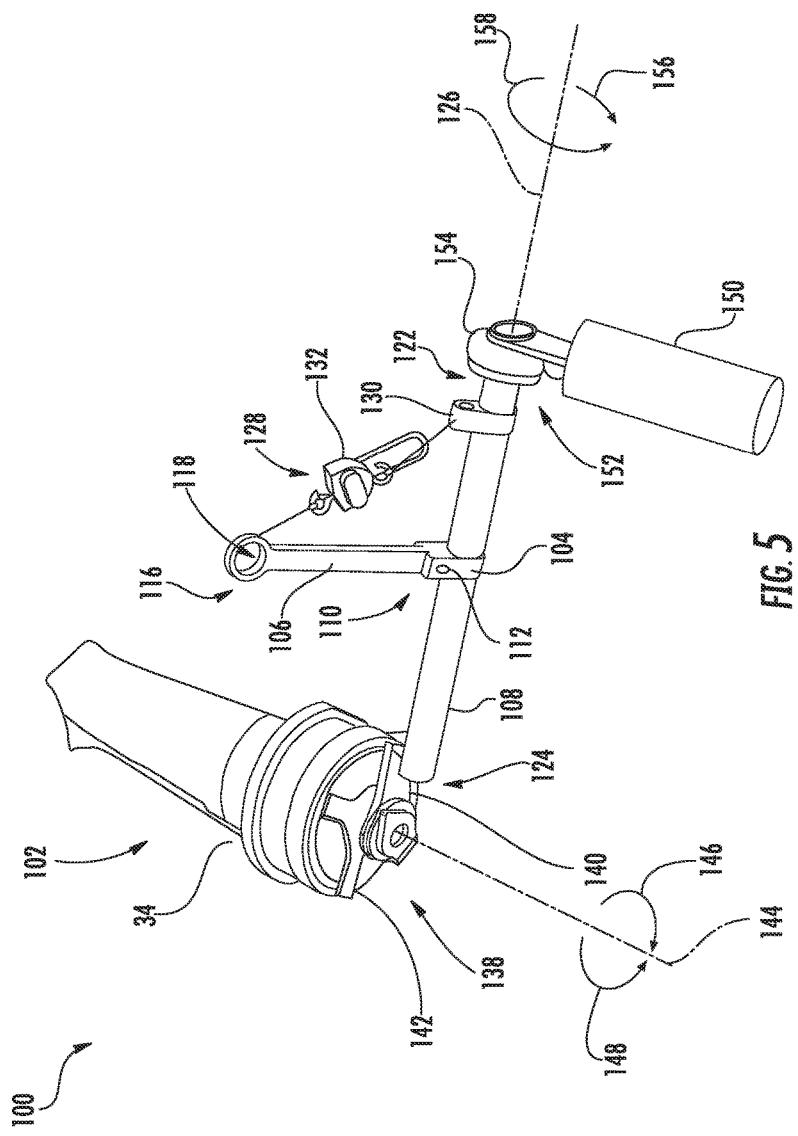
FIG. 5 is a perspective view of the turbomachine component handling assembly shown in FIGS. 3 and 4, illustrating the relative locations of various components thereof when a turbomachine component is in a second loaded position in accordance with one embodiment of the present disclosure.

FIG. 5 illustrates the handling assembly in a second loaded position. For example, the second loaded position may be used to install the turbomachine component 102 into the turbomachine 10. As shown, the second actuator 122 rotates the beam 108 relative to the counterweight 150 such that the counterweight 150 moves in the first direction 156 and the turbomachine component 102 moves in the second direction 158. In particular embodiments, the first direction 156 is different than the second direction 158. In this respect, the turbomachine component 102 may be positioned to permit installation into the compressor discharge casing 32 (FIG. 2) Furthermore, the turbomachine component 102 may be rotated about rotation axis 144 in the first or second direction 146, 148 to properly orient the turbomachine component 102 for insertion into the compressor discharge casing 32. Additionally, as shown, the aperture 118 of the arm 106 is still aligned along the longitudinal axis 126 with the base member 104 to balance the handling assembly 100 and turbomachine component 102 on the crane hook 120. After the turbomachine component 102 is installed into the turbomachine 10, the handling assembly 100 is adjusted back to the unloaded configuration shown in FIG. 4 such that the handling assembly 100 is balanced on the crane hook 120 when decoupled from the turbomachine component 102. In alternate embodiments, the handling assembly 100 may have other configurations in the unloaded position. Furthermore, the handling assembly 100 may be configured in different positions in addition to or in lieu of the first and second loaded positions described above.

As described in greater detail above, the handling assembly 100, which may be used to install the turbomachine component 102 into the turbomachine 10, permits adjustment of the turbomachine component 102 about various axes. Unlike conventional lifting devices, however, the handling assembly 100 includes fewer components and may be coupled to a crane. In this respect, the handling assembly 100 is lighter, simpler, and less expensive than conventional lifting devices. As such, the use of the handling assembly 100 reduces the cost of assembling the gas turbine engine 10 compared to the use of conventional lifting devices.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A component handling assembly, comprising:
   a base member;
   an arm pivotably coupled to the base member;
   a beam rotatably coupled to the base member;
   a first actuator coupled between the arm and the beam, the first actuator being configured to pivot the arm relative to the base member and the beam;
   a counterweight rotatably coupled to a first end of the beam; and
   a coupling assembly coupled to a second end of the beam, the coupling assembly being configured for coupling to a component,
   wherein rotating the counterweight in a first direction rotates the beam, the coupling assembly, and the component in a second direction.

2. The assembly of claim 1, wherein the first actuator comprises a motor-driven winch.

3. The assembly of claim 1, wherein a first end of the arm is pivotably coupled to the base member and a second end of the arm defines the aperture for receiving a crane hook.

4. The assembly of claim 3, wherein the first actuator is coupled between the aperture and a portion of the beam between the base member and the first end of the beam.

5. The assembly of claim 1, further comprising:
   a second actuator configured to rotate the counterweight relative to the beam.

6. The assembly of claim 5, wherein the second actuator comprises a motor-driven slewing drive.

7. The assembly of claim 1, wherein the component is a turbomachine combustor.

8. The assembly of claim 1, wherein the coupling assembly comprises a mounting plate fixedly coupled to the second end of the beam and a mating bracket rotatably coupled the mounting plate.

9. The assembly of claim 8, wherein rotating the mating bracket relative to the mounting plate rotates the component relative to the beam.

10. A component handling assembly, comprising:
    a base member;
    an arm pivotably coupled to the base member;
    a beam rotatably coupled to the base member;
    a counterweight rotatably coupled to a first end of the beam;
    an actuator configured to rotate the counterweight relative to the beam; and
    a coupling assembly coupled to a second end of the beam, the coupling assembly being configured for coupling to a component,
    wherein rotating the counterweight in a first direction rotates the beam, the coupling assembly, and the component in a second direction.

11. The assembly of claim 10, wherein the actuator comprises a motor-driven slewing drive.

12. A component handling assembly, comprising:
    a base member;
    an arm pivotably coupled to the base member;
    a beam rotatably coupled to the base member;
    a counterweight rotatably coupled to a first end of the beam;
    a coupling assembly coupled to a second end of the beam, the coupling assembly being configured for coupling to a component, the coupling assembly including a mounting plate fixedly coupled to the second end of the beam and a mating bracket rotatably coupled the mounting plate,
    wherein rotating the counterweight in a first direction rotates the beam, the coupling assembly, and the component in a second direction.

13. The assembly of claim 12 wherein rotating the mating bracket relative to the mounting plate rotates the component relative to the beam.

* * * * *